(12) United States Patent
Cleaver et al.

(10) Patent No.: US 10,990,930 B2
(45) Date of Patent: Apr. 27, 2021

(54) AUTONOMOUS EVENT GENERATOR

(71) Applicant: INTERNATIONAL BUSINESS MACHINES CORPORATION, Armonk, NY (US)

(72) Inventors: James D. Cleaver, Sydney (AU); Mark Donovan, Sydney (AU); Stephen J. Lea, Thornleigh (AU); Michael J. Mcguire, Beaumont Hills (AU)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 15/626,489

(22) Filed: Jun. 19, 2017

(65) Prior Publication Data

US 2018/0365653 A1 Dec. 20, 2018

(51) Int. Cl.
*G06Q 10/10* (2012.01)
*H04L 29/08* (2006.01)

(52) U.S. Cl.
CPC .......... *G06Q 10/1095* (2013.01); *H04L 67/10* (2013.01)

(58) Field of Classification Search
CPC ........ G06Q 10/00; G06Q 40/00; G06Q 40/06; G06Q 10/1095
USPC ...................................................... 705/7.19
See application file for complete search history.

(56) References Cited

U.S. PATENT DOCUMENTS

| | | | |
|---|---|---|---|
| 6,101,480 A | 8/2000 | Conmy et al. | |
| 7,984,378 B1 * | 7/2011 | Atkins | G06Q 10/109 715/733 |
| 8,301,479 B2 * | 10/2012 | Bourne | G06Q 10/10 705/7.19 |
| 8,681,808 B1 * | 3/2014 | Tessier | G06Q 10/1093 370/252 |
| 2009/0204904 A1 * | 8/2009 | Mujkic | G06Q 10/109 715/753 |
| 2009/0307045 A1 | 12/2009 | Chakra et al. | |
| 2013/0226645 A1 | 8/2013 | Renaghan | |
| 2014/0172483 A1 * | 6/2014 | Bellers | G06Q 50/14 705/7.16 |

(Continued)

OTHER PUBLICATIONS

Abid et al "Verification and Validation of a Multi Agent Meeting Scheduling Simulation Model", Mar. 2014, Journal of Computer Science and Information Technology vol. 2, No. 1, pp. 47-64 (Year: 2014).*

(Continued)

*Primary Examiner* — Romain Jeanty

(74) *Attorney, Agent, or Firm* — Patrick J. Daugherty; Daugherty & Del Zoppo Co., LPA

(57) ABSTRACT

Computerized devices search each of a group of different calendars of a group of attendees of a proposed event for an available timeslot within each of the calendars that meets boundary conditions specified for the proposed event. In response to failing to find an available time slot in common to all attendee calendars that meets the boundary conditions, the devices autonomously identify a common existing event scheduled within the calendars of the attendees that can accommodate the boundary conditions and add the new event to the existing event, or reschedule a previously scheduled event of one or more of the attendees to create a common, free timeslot for the new event where the event cannot be accommodated within an existing event.

18 Claims, 4 Drawing Sheets

(56) References Cited

U.S. PATENT DOCUMENTS

| | | |
|---|---|---|
| 2015/0356516 A1 | 12/2015 | Kagan et al. |
| 2016/0189112 A1* | 6/2016 | Kidron ............... G06Q 10/1095 |
| | | 705/7.19 |
| 2016/0231912 A9* | 8/2016 | Costa .................... G06F 3/0481 |
| 2017/0032558 A1* | 2/2017 | Mason, Jr. ......... G06K 9/00449 |
| 2017/0199656 A1* | 7/2017 | Costa .................... G06F 3/0481 |

OTHER PUBLICATIONS

Peter Mell et al, The NIST Definition of Cloud Computing, National Institute of Standards and Technology, Publication 800-145, 2011.
Olli Korjus, Meeting Scheduling Assistant: Automatic scheduling between heterogeneous calendar systems, Aalto University School of Science, Master's Thesis, 2012.
M. Sugumaran et al, An Effective Approach for Distributed Meeting Scheduler, International Journal of Information Technology, vol. 12, No. 8, 2006.
Calendly, Scheduling appointments and meetings is super easy with Calendly, https://calendly.com, 2017.
Eric Ravenscraft, Google Calendar Now Automatically Finds Time in Your Schedule for Your Goals, 2016.
Kevin Lee, How to Reschedule in Google Calendar, www.airbnb.com, 2017.

\* cited by examiner

AUTONOMOUS EVENT GENERATOR

BACKGROUND

Automated, virtual scheduling assistants are applications ("apps") executing on computerized device processors that provide professional administrative, technical, or creative assistance to clients. Organizations may employ automated scheduling assistants to perform roles typically performed by a secretary; these roles may include meeting scheduling. Generally, a member of an organization reviews his or her calendar for available dates and times in response to a request to meet with another person, and when a free time is identified that is agreeable to all attendees of the meeting, employs an automated scheduling assistant to schedule the meeting within a calendaring application from dates and time data specified by a scheduling command or within email or other messaging content.

SUMMARY

Computerized devices search each of a group of different calendars of a group of attendees of a proposed event for an available timeslot within each of the calendars that meets boundary conditions specified for the proposed event. In response to failing to find an available time slot in common to all attendee calendars that meets the boundary conditions, the devices autonomously identify a common existing event scheduled within the calendars of the attendees that can accommodate the boundary conditions and add the new event to the existing event, or reschedule a previously scheduled event of one or more of the attendees to create a common, free timeslot for the new event where the event cannot be accommodated within an existing event.

In one aspect of the present invention, a computerized method for scheduling an event includes executing steps on a computer processor. Thus, a computer processor is configured to receive event data, wherein the event data includes a plurality of attendees, an agenda item and an event completion date, search each of a plurality of calendars of each of the attendees for available time slots before the event completion date and determine whether all the attendees have at least one available time slot in common within each of the calendars of the attendees that can accommodate a length of time required for the new event to accommodate the agenda item. If the processor determines that all of the attendees do not have at least one available time slot in common within the calendars of the attendees, then the processor reschedules a previously scheduled event for a first of the attendees from a first time slot to another time slot, wherein the rescheduling creates a free time slot within each of the plurality of calendars for all the attendees that spans the length of time required for the new event and includes the first time slot schedules an event that includes the agenda item during the free time slot within each of the calendars of the attendees.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to receive event data, wherein the event data includes a plurality of attendees, an agenda item and an event completion date, search each of a plurality of calendars of each of the attendees for available time slots before the event completion date, and determine whether all the attendees have at least one available time slot in common within each of the calendars of the attendees that can accommodate a length of time required for the new event to accommodate the agenda item. In response to determining that all of the attendees do not have at least one available time slot in common within the calendars of the attendees, the processor reschedules a previously scheduled event for a first of the attendees from a first time slot to another time slot, wherein the rescheduling creates a free time slot within each of the plurality of calendars for all the attendees that spans the length of time required for the new event and includes the first time slot and schedules an event that includes the agenda item during the free time slot within each of the calendars of the attendees.

In another aspect, a computer program product for scheduling an event has a computer-readable storage medium with computer readable program code embodied therewith. The computer readable hardware medium is not a transitory signal per se. The computer readable program code includes instructions for execution which cause the processor to receive event data, wherein the event data includes a plurality of attendees, an agenda item and an event completion date, search each of a plurality of calendars of each of the attendees for available time slots before the event completion date, and determine whether all the attendees have at least one available time slot in common within each of the calendars of the attendees that can accommodate a length of time required for the new event to accommodate the agenda item. In response to determining that all of the attendees do not have at least one available time slot in common within the calendars of the attendees, the processor reschedules a previously scheduled event for a first of the attendees from a first time slot to another time slot, wherein the rescheduling creates a free time slot within each of the plurality of calendars for all the attendees that spans the length of time required for the new event and includes the first time slot and schedules an event that includes the agenda item during the free time slot within each of the calendars of the attendees.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
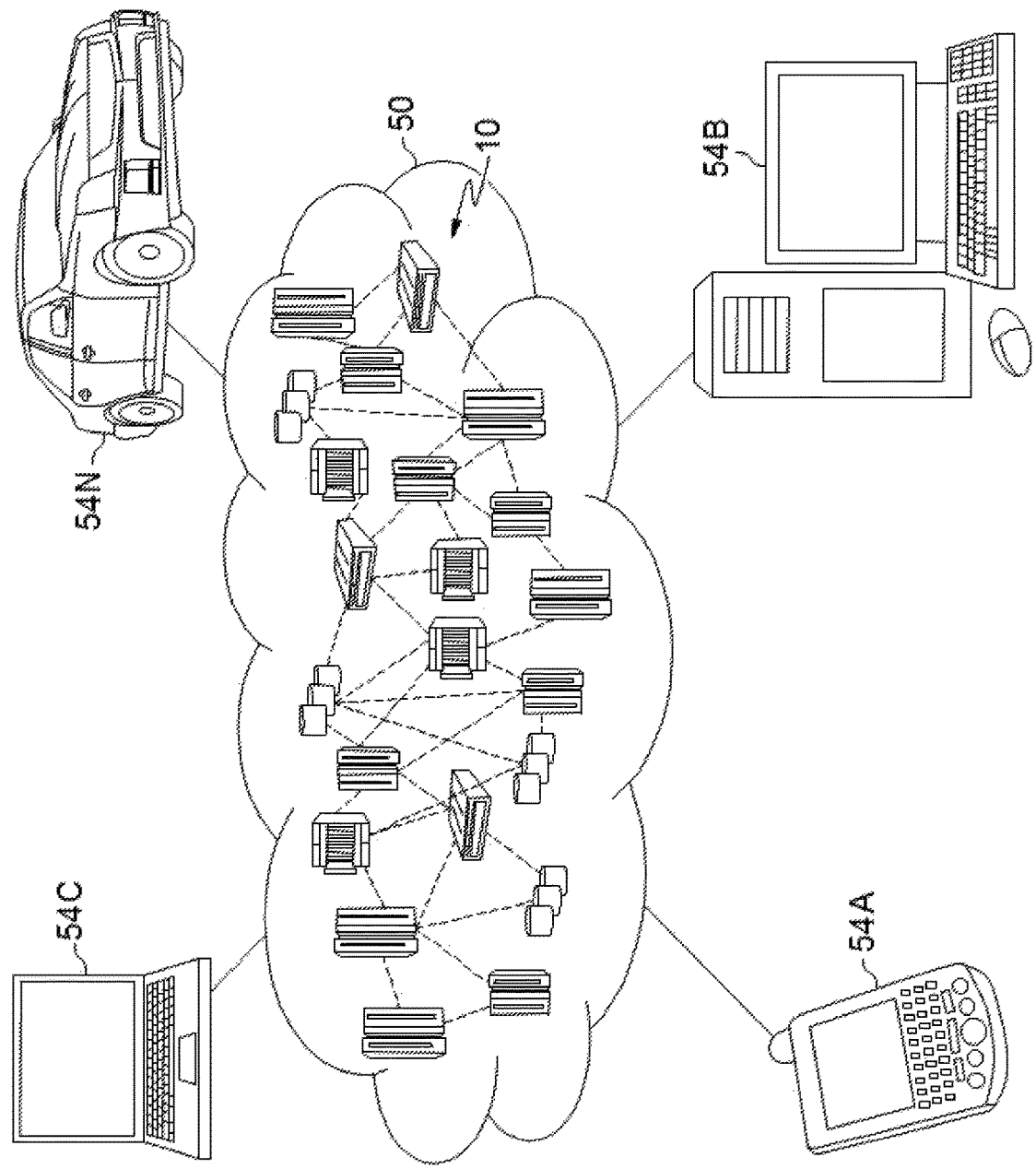
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
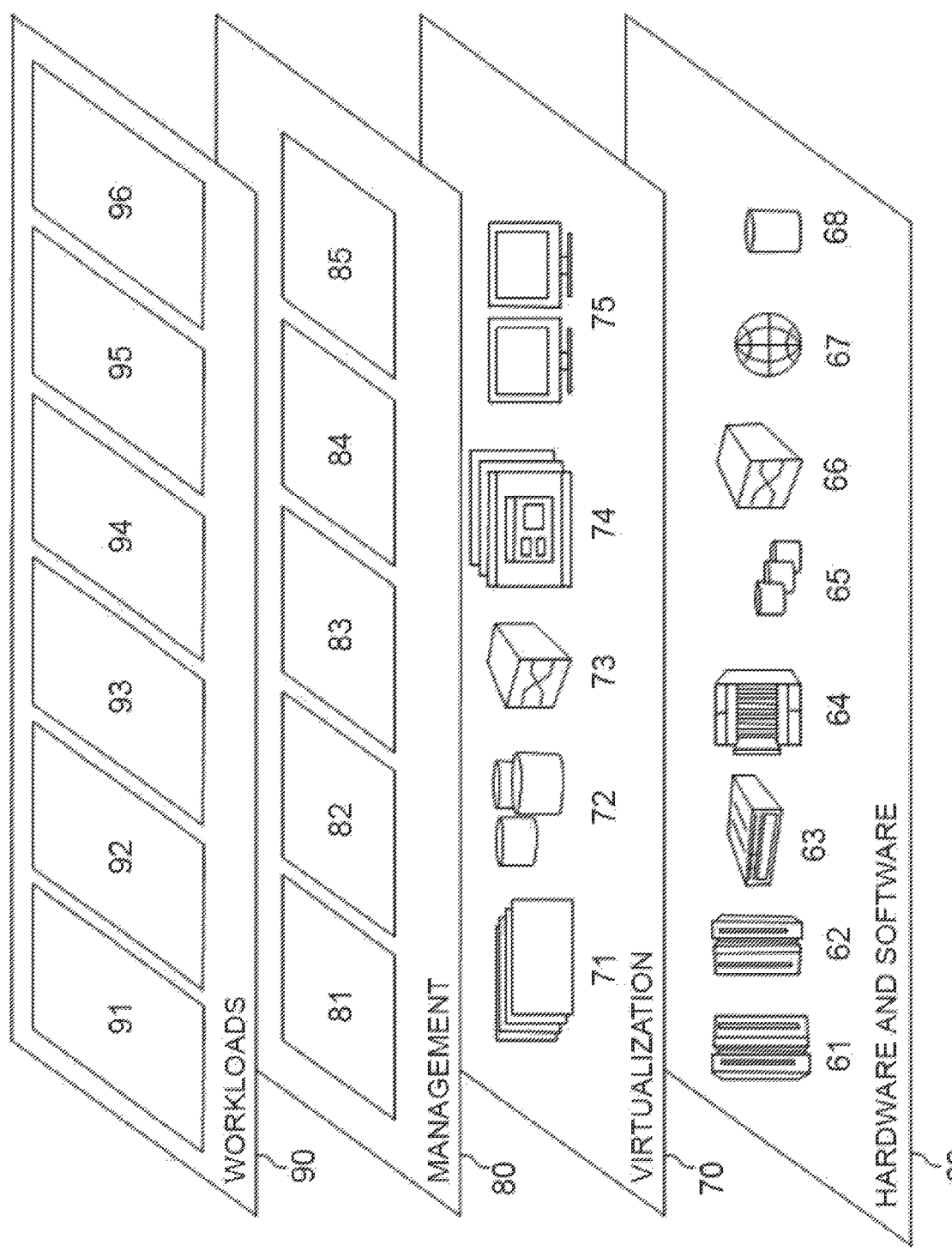
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for scheduling an event 96.

Figure 3:
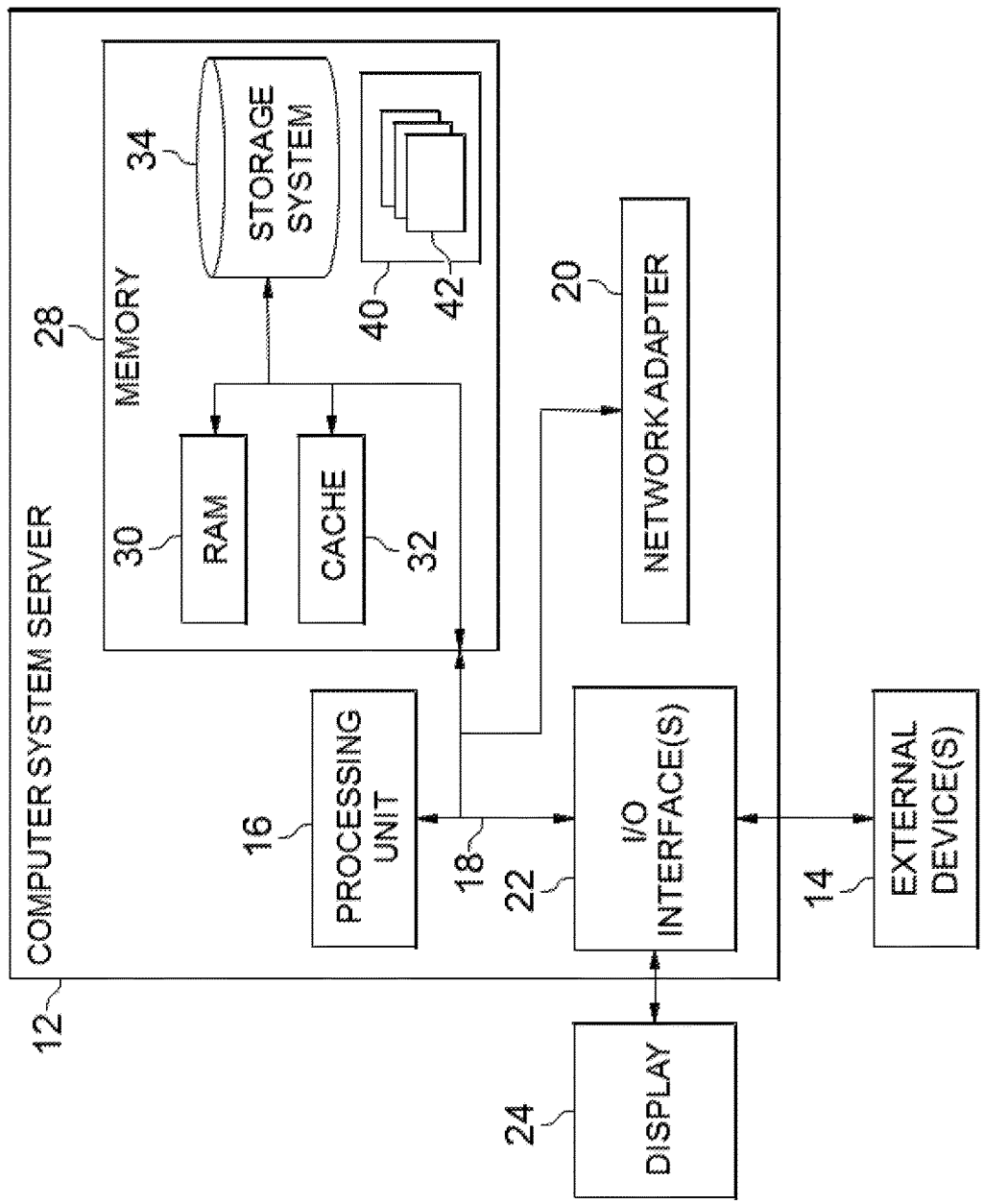
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
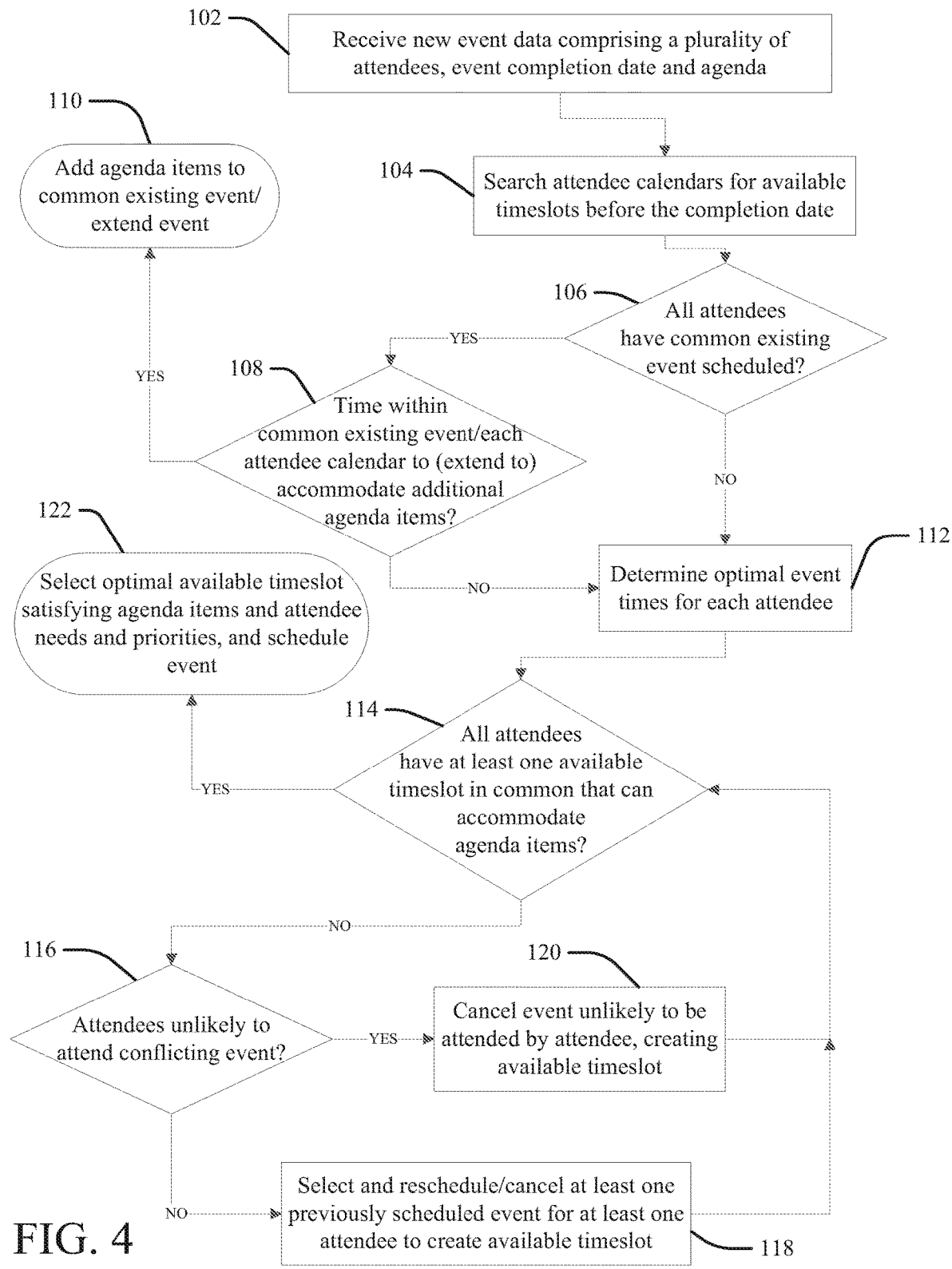
FIG. 4 is a flow chart illustration of an embodiment of the present invention.

FIG. 4 illustrates a process or system according to the present invention for scheduling an event. At 102 a processor that is configured according to an aspect of the present invention (the "configured processor") receives event data. The event data includes at least a plurality of attendees and an event completion date, the latest date the event can occur.

The event data may further comprise agenda items, or scheduling rules that apply scheduling restraints for when an event may be scheduled, cancelled or rescheduled, as discussed below. The configured processor may be implemented in accordance with the computer system server 10 of FIG. 3, including as the cloud node 10 of FIG. 1, as described respectively above.

At 104 the configured processor searches attendee calendars for available time slots that occur before the completion date and accommodate a time length of a new event that comprehends the event data. The event data received at 102 may include the event length (for example, "Project X status meeting, 30 minutes maximum"), or the configured processor may determine the event length based on default settings or rule application (for example, for agenda text data including "status update" string, select 30 minutes as default length; for agenda text data including "brain storming" string, select 45 minutes as default length).

At 106 the configured processor determines whether all the attendees have a common existing event scheduled. If the configured processor determines all the event attendees have a common existing event scheduled, then the configured processor proceeds to 108. If the configured processor determines all the event attendees do not have a common existing event scheduled, then the configured processor proceeds to 112.

At 108, the configured processor determines if there is time within the common exiting event to accommodate the length of time required for the new event (including as determined at 104), or if there is time within each attendee calendar to extend the common existing event in order to accommodate additional agenda items (over or defining the length of time required for the new event). The configured processor may compare the currently scheduled agenda items with the time allotted for the entire event. In one example, a common 45 minute meeting has a first agenda item entitled "general polices" that is allotted 15 minutes, and a second agenda item entitled "IT training" that is allotted 30 minutes. Based on these two agenda items, the configured processor determines that there is no additional time within the event to accommodate the length of time required for the additional agenda items of the new event, and moves on to the process step 112.

In another example, the configured processor determines at 108 that during a common, 60-minute meeting the agenda items "general polices" and "IT training" account for 45 of the 60 minutes, and that the additional agenda item, "new hires," is allotted 10 minutes within the event data 102. In this instance, the configured processor determines the event can accommodate the "new hires" agenda item, and adds it to the existing, common meeting at 110 as comprising 10 minutes of the total available meeting time.

A user setting may indicate free time built within an existing event. In yet another example, during a common 60 minute meeting the agenda items "general policies" and "IT training" account for 45 minutes and a third agenda item "free time" is allotted 15 minutes. In response to determining that the length of time allotted for the additional agenda item is 15 minutes or less, the configured processor determines the common event can accommodate the additional agenda item during the "free time" agenda item, and responsively adds it to said existing, common meeting at 110.

In another example of the process at 110, if the configured processor determines there is time within a common existing event to accommodate the additional agenda items, then the configured processor adds the additional agenda items to the common existing event. For example, on Monday, the configured processor receives event data comprising attendees Alice, Bob, and Charlie, the agenda item "personnel training—30 minutes" and the event completion date of Friday. The configured processor establishes that Alice, Bob, and Charlie have a common event at 1500 on Wednesday. The Wednesday is allotted 90 minutes and comprises the agenda item "quarterly update—60 minutes." The configured processor determines the event contains 30 unassigned minutes, and as such determines that the Wednesday event can accommodate the additional agenda items. The configured processor then adds the additional agenda item "personnel training" to the Wednesday event at 110.

If the configured processor determines instead at 108 there is not enough free or otherwise available time within the common existing event to accommodate the time required for additional agenda items, the configured processor extends the time allocated within each attendee calendar for the common existing event into adjacent free time slots in order to generate a new or revised event or event time length that accommodates the additional agenda items, and adds the additional agenda items to the new/revised event.

If the configured processor determines all attendees do not have a common existing event scheduled at 106, or determines that there is not time within the common existing event to add the additional agenda items and determines that there is not time within each attendee calendar to extend the common existing event in order to accommodate the additional agenda items at 108, then the configured processor analyzes attendee calendars to determine an optimal event times for each attendee at 112. Optimal time slot parameters may include time slots that occur within business hours, time slots best suited for the highest ranking attendee (for instance when scheduling an event for multiple attendees located in multiple time zones, the highest ranking employee has two free time slots, one within business hours and one at 0200, the time slot within business hours is optimal for the highest ranking employee and may be used to schedule the event even if the 0200 time slot is within business hours and is free for all other attendees), time slots that do occur when an attendee has previously scheduled events, and time slots that have not previously included events (for instance, if an attendee never schedules events for 1000 on a Tuesday), or if the event attendees are located in multiple time zones, a time slot that occurs within business hours for each attendee. At 106, the configured processor also assigns a value to each optimal time slot as a function of an optimal time slot parameter and schedules the event based on the highest valued optimal time slot.

For example, on Monday, the configured processor receives event data comprising attendees Alice, Bob, and Charlie, the agenda items, and the event completion date of Friday. The configured processor determines that Alice, Bob, and Charlie have available time slots that can accommodate the agenda items at 1700 on Tuesday and 0700 on Thursday. However, Bob never schedules events for 0700, no matter the day of the week, and accordingly this time slot is assigned a negative flag or value to prevent its selection as an optimal slot. Thus, the configured processor selects and schedules the event for 1700 on Tuesday as the optimal available time slot.

At 114, the configured processor determines whether all attendees have multiple available time slots in common that can accommodate the agenda items; if so, at 122, the configured processor selects an optimal time slot for the event from the optimal time values determined at 112 and schedules the event during the selected optimal available time slot. For example, on Monday, the configured processor receives event data comprising attendees Alice, Bob, and Charlie, the agenda items, and the event completion date of Friday. The event data further comprises the time zone for Alice, Bob, and Charlie (Alice and Bob are in EST and Charlie is in PST). The configured processor determines Alice, Bob, and Charlie have two available time slots, one at 1000 EST on Tuesday and another at 1700 on Tuesday. Since 1000 time slot occurs within business hours for Alice and Bob, but not Charlie, the configured processor assigns a higher score for the 1000 time slot with respect to Alice and Bob. Since the 1700 time slot occurs within business hours for Charlie, the configured process assigns a higher score for the 1000 time slot with respect to Charlie. The configured processor may average the scores with respect to the three attendees, thereby determining the 1000 time slot has a higher average score than the 1700 time slot. Since the 1000 time slot has the highest average score, the configured processor selects the 1000 time slot as optimal.

If the configured processor determines that all the attendees do not have at least one available time slot in common at 114, then at 116 the configured processor determines likelihoods that each attendee will attend conflicting events that are scheduled within each attendee calendar and conflict with free slots available within the calendars of remaining others of the attendees. The configured processor may analyze each attendee calendar to determine past behavior in order to determine the likelihood each attendee will attend a conflicting event.

For example, on Monday, the configured processor receives event data comprising attendees Alice, Bob, and Charlie, the agenda items, and the event completion date of Friday. The configured processor determines Alice and Bob have free time that can accommodate the event at 1500 on Tuesday; however, Charlie has a conflicting event entitled "coffee with Dave." The configured processor also determines Bob and Charlie have free time that can accommodate the event at 1000 on Wednesday, but Alice has a conflicting event entitled "status update with Erin." The configured processor analyzes Alice's calendar and determines Alice infrequently (less than a frequency threshold value of 20% of the time, or some other value) cancels, moves or misses an event entitled "status update" or that include Erin as an attendee within the last year. The configured processor also analyzes Charlie's calendar and determines that Charlie frequently cancels (more than the 20% of the time or some other threshold) of meetings having "coffee with" agenda descriptors, or any meeting with Dave independent of agenda. The configured processor thus determines it is likely that Alice will attend the "status update with Erin" event and determines it is not likely that Charlie will attend the "coffee with Dave" event.

In response to identifying a conflicting event that an attendee is not likely to attend at 116 (relative to another meeting likelihood, or meeting a likelihood to cancel threshold, etc.), at 120 the configured processor selects one of the conflicting events that has a highest probability that an attendee will not attend and cancels the selected event, thereby creating at least one common available time slot. Selection of a conflicting event for cancellation may be based on a set of predetermined rules, including as supplied in the new event data at 102. These may include preventing the cancelation of an event with external attendees, preventing the scheduling of events within a threshold time of one another (for example, five minutes or some other threshold), preventing the cancelation of an event with an attendee with a certain title (for example, partner, administrator, or chief), or preventing the cancelation of recurring events (for example, a status meeting that occurs every Tuesday at 0900). In response to canceling the selected event, the configured processor proceeds to 114.

In response to not identifying a conflicting event that an attendee is not likely to attend at 116, at 118 the configured processor selects and reschedules or cancels at least one previously scheduled event for at least one attendee in order to create at least one available time slot as a function of attendee priority status, calendar loading efficiency and/or other attributes or values. Thus, the configured processor may make a selection at 118 in order to minimize a total number of meeting cancelations or rescheduling. For example, on Monday the configured processor receives event data comprising attendees Alice, Bob, and Charlie and the event completion date of Friday. The configured processor determines there is no common available time slot. However, the configured processor determines that Alice and Charlie have a common available time slot at 1200 on Tuesday, but Bob has a meeting at that time. The configured processor further determines that Bob has an available time slot at 1500 on Thursday that can accommodate the agenda of his 1200 Tuesday meeting (for example, Bob's calendar and the calendar of the other person listed in Bob's meeting each have availability at the other, available time slot). Accordingly, the configured processor reschedules Bob's 1200 Tuesday meeting for 1500 on Thursday, thereby cancelling the fewest number of meetings (one meeting of only one of the attendees), creating a common available time slot at 1200 on Tuesday.

At 118, the configured processor may also use a set of priority rules for determining whose event gets rescheduled. These rules may include moving an event belonging to the lowest ranking attendee or set of attendees or having a lowest average priority score determined from the priority values of all attendees relative to other conflicting meetings; preventing the moving of an event with an external attendee; preventing the moving of a recurring event; and still other examples will be apparent to one skilled in the art. In one example, on Monday the configured processor receives event data comprising attendees Alice (the CEO), Bob (the CFO), and Charlie (the local branch manager) and the event completion date of Friday. The configured processor determines there is no common available time slot. However, the configured processor determines that Alice and Charlie have a common available time slot at 1200 on Tuesday, but Bob has a meeting at that time and determines that Alice and Bob have a common available time slot at 0900 on Wednesday, but Charlie has a meeting at that time. The configured processor applies a rule that provides that in the event that moving one of multiple preexisting events may create a common existing available time slot that can accommodate the event, the configured processor should move the event of the lowest ranking employee. The configured processor also determines that both Bob's and Charlie's existing meetings may be rescheduled. Due to the above rule, the configured processor will reschedule Charlie's existing meeting in response to considering his lower employee rank relative to the ranks of both Alice and Bob, thereby creating a common available time slot for Alice, Bob, and Charlie at 0900 on Wednesday.

Thus, via repeated executions of combinations of the steps 114-116-120 and 114-118, the configured processor iteratively identifies, selects and cancels events until a common, open time slot is identified at 114, wherein the common open slot is used to schedule an event at 122 that satisfies the request received at 102.

In some embodiments, the configured processor selects and reschedules or cancels at least one previously scheduled event for the at least one attendee at 118 based on agenda importance within the previously scheduled event or based on the attendee priority in order to create the at least one available time slot. For example, an event with the agenda text containing "coffee" will be given less priority than an event with the title "quarterly financial strategy," or an event wherein the attendees comprise the CEO, CFO, and CIO will be given more importance than a meeting wherein the attendees are consultants.

In some embodiments, the configured processor uses scheduling rules to schedule the event at 110 or 122. Illustrative but not limiting or exhaustive examples of rule applications include determining that events may only be scheduled during business hours; that events may not be scheduled on days wherein an attendee has three or more events; and that an event may not be scheduled within one hour of a preexisting event.

Virtual assistants are fairly common. However, they are more about helping an individual manage their calendar in isolation of other people. The present invention extends this concept to a new level and makes the assistant aware of the entire organization and makes decisions based on analytics (and cognitive reasoning) that is better played for the majority of people.

Thus, aspects of the present invention use analytics on all of the calendar functions and features of an organization. Instead of having to use a "find free time" or any other feature, an event attendee inputs the last day an event needs to be completed by. Aspects of the invention then searches through the calendars of several people to see if it can find a suitable match with the attendees as a function of their individual and relative priority, importance, conflicting meeting agenda attributes, tendencies and other values. Aspects provide advantages for people who are working in a global role, and are scheduling across multiple time zones. By adding the agenda items to already scheduled events wherein all the event attendees will participate, aspects provide efficiencies by eliminating the need to schedule a new event.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
executing an automated scheduling assistant on a computerized device processor;
receiving event data, wherein the event data comprises a plurality of attendees, an agenda item, and an event completion date;
searching each of a plurality of calendars of each of the attendees for available time slots before the event completion date;
determining whether all the attendees have at least one available time slot in common within each of the calendars of the attendees that can accommodate a length of time required for a new event to accommodate the agenda item;
in response to determining that all of the attendees do not have at least one available time slot in common within the calendars of the attendees, the automated scheduling assistant autonomously selecting another time slot for rescheduling a previously scheduled event for a first of the attendees from a first time slot as a function of complying with a rule that is selected from the group consisting of preventing moving an event with an external attendee, preventing scheduling of the another time slot within a threshold time of another event scheduled within the calendars of the attendees, preventing a cancelation of an event with an attendee with a certain title, and preventing a cancelation of a recurring event;
the automated scheduling assistant autonomously rescheduling the previously scheduled event for the first of the attendees from the first time slot to the another time slot, wherein the rescheduling creates a free time slot within each of the plurality of calendars for all the attendees that spans the length of time required for the new event and includes the first time slot; and
the automated scheduling assistant autonomously scheduling an event that includes the agenda item during the free time slot within each of the calendars of the attendees.

2. The method of claim 1, further comprising:
in response to determining that a common existing event is scheduled within each of the calendars of the attendees that can accommodate the length of time of required for the new event, adding the agenda item to the common existing event; and
in response to determining that a common existing event is scheduled within each of the calendars of the attendees that cannot accommodate the length of time of the agenda item, creating a revised event within each of the plurality of calendars of the attendees having a length of time that spans the common existing event and the length of time required for the new event, and adding the agenda item and agenda items of the common existing event to the revised event.

3. The method of claim 1, further comprising, in response to determining that all of the attendees do not have at least one available time slot in common within the calendars of the attendees:
- analyzing the calendars of the attendees to determine relative likelihoods that each attendee will attend conflicting events that are scheduled within each attendee calendar and conflict with free slots available within the calendars of remaining others of the attendees;
- canceling a one of the conflicting events that has a highest relative likelihood that an attendee will not attend, wherein the canceling creates a new commonly available time slot within each of the calendars of the attendees; and
- scheduling an event that includes the agenda item during the new commonly available time slot within each of the calendars of the attendees.

4. The method of claim 1, further comprising:
- the automated scheduling assistant selecting the length of time required for the new event as a function of type of meeting identified within text content of the agenda item.

5. The method of claim 1, further comprising, in response to determining that all of the attendees do not have at least one available time slot in common within the calendars of the attendees:
- determining priority rank values of available attendees within an organization of the available attendees; and
- in response to determining that moving one of multiple preexisting events creates a common available time slot for all the available attendees, moving the preexisting event belonging to a lowest ranking attendee of the available attendees.

6. The method of claim 1, further comprising:
- analyzing the calendars of the attendees to determine a plurality of event times available for each of the attendees;
- assigning an optimal value to each of the event times as a function of attendee attributes of the event times that are selected from the group consisting of priority rank values of available attendees, occurrence time within business hours for attendees, occurrence time within a time slot that has previously included events for attendees, and occurrence time within a time slot that has not previously included events for attendees; and
- scheduling the event in a time slot having a highest assigned optimal value.

7. The method of claim 6, wherein some of the attendees are located in different time zones, and wherein the step of assigning optimal values to the plurality of event times is a function of occurrence time relative to business hours that are common to the locations of each of the attendees.

8. The method of claim 6, further comprising assigning the optimal value to each of the event times as a function of a total number of the attendees that are available during the time slot and that meet the attendee attribute.

9. The method of claim 1, further comprising:
- integrating computer-readable program code into a computer system comprising the processor, a computer readable memory in circuit communication with the processor, and a computer readable storage medium in circuit communication with the processor; and
- wherein the processor executes program code instructions stored on the computer-readable storage medium via the computer readable memory and thereby performs the executing the automated scheduling assistant, the receiving event data, the searching each of the plurality of calendars of each of the attendees for available time slots before the event completion date, the determining whether all the attendees have at least one available time slot in common within each of the calendars of the attendees that can accommodate the length of time required for the new event to accommodate the agenda item, the selecting via the automated scheduling assistant the another time slot for rescheduling the previously scheduled event for the first of the attendees from the first time slot, the autonomously rescheduling via the automated scheduling assistant the previously scheduled event for the first of the attendees from the first time slot to the another time slot, and the autonomously scheduling via the automated scheduling assistant the event that includes the agenda item.

10. The method of claim 9, wherein the computer-readable program code is provided as a service in a cloud environment.

11. A system, comprising:
- a processor;
- a computer readable memory in circuit communication with the processor; and
- a computer readable storage medium in circuit communication with the processor;
- wherein the processor executes program instructions stored on the computer-readable storage medium via the computer readable memory and thereby:
- executes a scheduling assistant;
- receives event data, wherein the event data comprises a plurality of attendees, an agenda item, and an event completion date;
- searches each of a plurality of calendars of each of the attendees for available time slots before the event completion date;
- determines whether all the attendees have at least one available time slot in common within each of the calendars of the attendees that can accommodate a length of time required for the new event to accommodate the agenda item;
- in response to determining that all of the attendees do not have at least one available time slot in common within the calendars of the attendees, autonomously selects via execution of the scheduling assistant another time slot for rescheduling a previously scheduled event for a first of the attendees from a first time slot as a function of complying with a rule that is selected from the group consisting of preventing moving an event with an external attendee, preventing scheduling of the another time slot within a threshold time of another event scheduled within the calendars of the attendees, preventing a cancelation of an event with an attendee with a certain title, and preventing a cancelation of a recurring event;
- autonomously reschedules via execution of the scheduling assistant the previously scheduled event for the first of the attendees from the first time slot to the another time slot, wherein the rescheduling creates a free time slot within each of the plurality of calendars for all the attendees that spans the length of time required for the new event and includes the first time slot; and
- autonomously schedules via execution of the scheduling assistant an event that includes the agenda item during the free time slot within each of the calendars of the attendees.

12. The system of claim 11, wherein the processor executes the program instructions stored on the computer-readable storage medium via the computer readable memory and in response to determining that all of the attendees do not have at least one available time slot in common within the calendars of the attendees thereby:
  analyzes the calendars of the attendees to determine relative likelihoods that each attendee will attend conflicting events that are scheduled within each attendee calendar and conflict with free slots available within the calendars of remaining others of the attendees;
  cancels a one of the conflicting events that has a highest relative likelihood that an attendee will not attend, wherein the canceling creates a new commonly available time slot within each of the calendars of the attendees; and
  schedules an event that includes the agenda item during the new commonly available time slot within each of the calendars of the attendees.

13. The system of claim 11, wherein the processor executes the program instructions stored on the computer-readable storage medium via the computer readable memory and in response to determining that all of the attendees do not have at least one available time slot in common within the calendars of the attendees thereby:
  determines priority rank values of available attendees within an organization of the available attendees; and
  in response to determining that moving one of multiple preexisting events creates a common available time slot for all the available attendees, moves the preexisting event belonging to a lowest ranking attendee of the available attendees.

14. The system of claim 11, wherein the processor executes the program instructions stored on the computer-readable storage medium via the computer readable memory and thereby:
  analyzes the calendars of the attendees to determine a plurality of event times available for each of the attendees;
  assigns an optimal value to each of the event times as a function of attendee attributes of the event times that are selected from the group consisting of priority rank values of available attendees, occurrence time within business hours for attendees, occurrence time within a time slot that has previously included events for attendees, and occurrence time within a time slot that has not previously included events for attendees; and
  schedules the event in a time slot having a highest assigned optimal value.

15. A computer program product for scheduling an event, the computer program product comprising:
  a computer readable storage medium having computer readable program code embodied therewith, wherein the computer readable storage medium is not a transitory signal per se, the computer readable program code comprising instructions for execution by a processor that cause the processor to:
  execute a scheduling assistant;
  receive event data, wherein the event data comprises a plurality of attendees, an agenda item, and an event completion date;
  search each of a plurality of calendars of each of the attendees for available time slots before the event completion date;
  determine whether all the attendees have at least one available time slot in common within each of the calendars of the attendees that can accommodate a length of time required for the new event to accommodate the agenda item;
  in response to determining that all of the attendees do not have at least one available time slot in common within the calendars of the attendees, autonomously select via execution of the scheduling assistant another time slot for rescheduling a previously scheduled event for a first of the attendees from a first time slot as a function of complying with a rule that is selected from the group consisting of preventing moving an event with an external attendee, preventing scheduling of the another time slot within a threshold time of another event scheduled within the calendars of the attendees, preventing a cancelation of an event with an attendee with a certain title, and preventing a cancelation of a recurring event;
  autonomously reschedule via execution of the scheduling assistant the previously scheduled event for the first of the attendees from the first time slot to the another time slot, wherein the rescheduling creates a free time slot within each of the plurality of calendars for all the attendees that spans the length of time required for the new event and includes the first time slot; and
  autonomously schedule via execution of the scheduling assistant an event that includes the agenda item during the free time slot within each of the calendars of the attendees.

16. The computer program product of claim 15, wherein the computer readable program code instructions for execution by the processor further cause the processor to, in response to determining that all of the attendees do not have at least one available time slot in common within the calendars of the attendees:
  analyze the calendars of the attendees to determine relative likelihoods that each attendee will attend conflicting events that are scheduled within each attendee calendar and conflict with free slots available within the calendars of remaining others of the attendees;
  cancel a one of the conflicting events that has a highest relative likelihood that an attendee will not attend, wherein the canceling creates a new commonly available time slot within each of the calendars of the attendees; and
  schedule an event that includes the agenda item during the new commonly available time slot within each of the calendars of the attendees.

17. The computer program product of claim 15, wherein the computer readable program code instructions for execution by the processor further cause the processor to, in response to determining that all of the attendees do not have at least one available time slot in common within the calendars of the attendees:
  determine priority rank values of available attendees within an organization of the available attendees; and
  in response to determining that moving one of multiple preexisting events creates a common available time slot for all the available attendees, move the preexisting event belonging to a lowest ranking attendee of the available attendees.

18. The computer program product of claim 15, wherein the computer readable program code instructions for execution by the processor further cause the processor to:
  analyze the calendars of the attendees to determine a plurality of event times available for each of the attendees;
  assign an optimal value to each of the event times as a function of attendee attributes of the event times that are selected from the group consisting of priority rank values of available attendees, occurrence time within business hours for attendees, occurrence time within a time slot that has previously included events for attendees, and occurrence time within a time slot that has not previously included events for attendees; and schedule the event in a time slot having a highest assigned optimal value.

* * * * *